US008488059B2

(12) United States Patent
Burns et al.

(10) Patent No.: US 8,488,059 B2
(45) Date of Patent: Jul. 16, 2013

(54) ADAPTATION OF FRAME SELECTION FOR FRAME RATE CONVERSION

(75) Inventors: Kathleen Burns, San Jose, CA (US); Kenneth Edward Vavreck, Langhorne, PA (US); Gerald Michael Roletter, Washington, DC (US); Larry Alan Pearlstein, Newtown, PA (US)

(73) Assignee: Broadcom Corporation, Irvine, CA (US)

( * ) Notice: Subject to any disclaimer, the term of this patent is extended or adjusted under 35 U.S.C. 154(b) by 339 days.

(21) Appl. No.: 12/855,094

(22) Filed: Aug. 12, 2010

(65) Prior Publication Data

US 2011/0141352 A1      Jun. 16, 2011

Related U.S. Application Data

(60) Provisional application No. 61/287,092, filed on Dec. 16, 2009.

(51) Int. Cl.
*H04N 7/01* (2006.01)
*H04N 11/20* (2006.01)

(52) U.S. Cl.
USPC .......................................... 348/441; 348/459

(58) Field of Classification Search
USPC .................................................. 348/441–459
See application file for complete search history.

(56) References Cited

U.S. PATENT DOCUMENTS 6,449,378 B1 * 9/2002 Yoshida et al. ............... 382/100
2007/0229703 A1 * 10/2007 Lu ................................. 348/441
2009/0174812 A1 * 7/2009 Hong ............................. 348/441

OTHER PUBLICATIONS

Sung-Hee Lee, Ohjae Kwon and Rae-Hong Park, Weighted-Adaptive Motion-Compensated Frame Rate Up-Conversion, IEEE Transactions on Consumer Electronics, vol. 49, No. 3, Aug. 2003, pp. 485-492.

* cited by examiner

*Primary Examiner* — Jefferey Harold
*Assistant Examiner* — Michael Teitelbaum
(74) *Attorney, Agent, or Firm* — Thomas | Horstemeyer, LLP

(57) ABSTRACT

At least a method and a system are described for providing frame rate upconversion by way of using "short side" or bidirectional interpolation in generating interpolated frames. In a representative embodiment, the method may comprise receiving a first frame of video corresponding to a first frame time and a second frame of the video corresponding to a second frame time, computing a first absolute difference between the first frame time and an interpolated frame time wherein the interpolated frame time temporally is located between the first frame time and the second frame time. The method further comprises using a first motion vector field and the first frame to compute a third frame at the interpolated frame time. The method further comprises outputting the third frame as the interpolated frame at the interpolated frame time if the first absolute difference is less than or equal to a first threshold value.

15 Claims, 7 Drawing Sheets

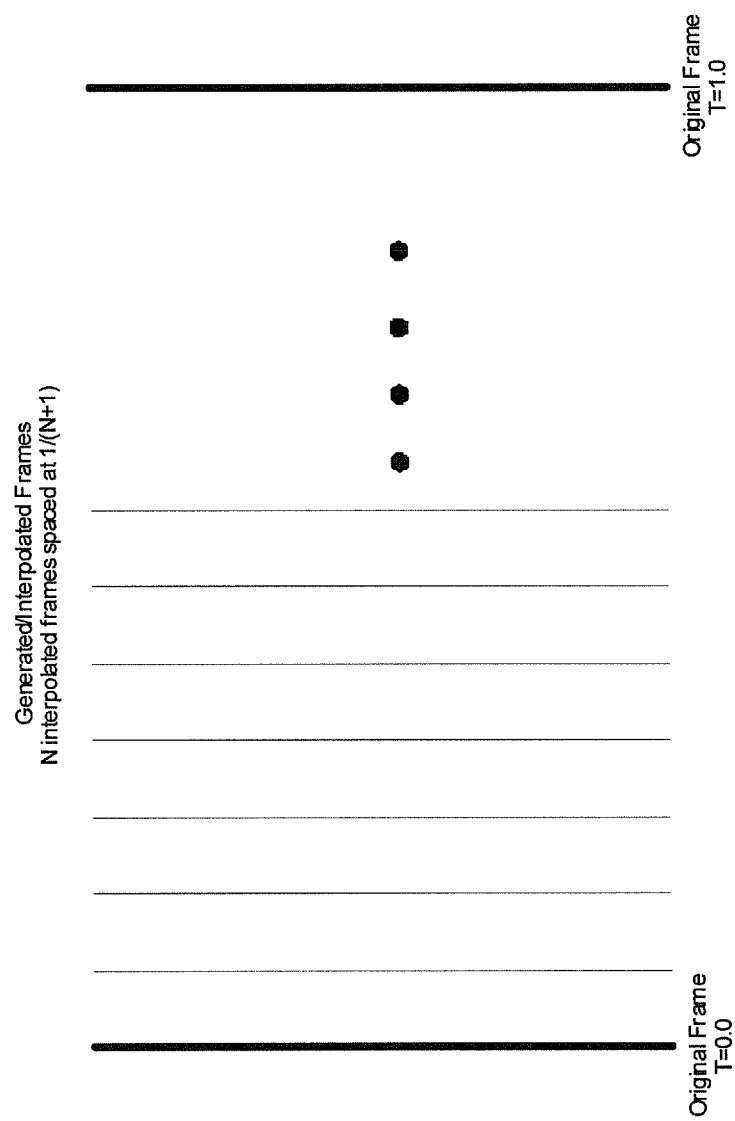

ADAPTATION OF FRAME SELECTION FOR FRAME RATE CONVERSION

CROSS-REFERENCE TO RELATED APPLICATIONS/INCORPORATION BY REFERENCE

This application makes reference to, claims priority to, and claims benefit from U.S. Provisional Patent Application Ser. No. 61/287092 entitled "ADAPTATION OF FRAME SELECTION FOR FRAME RATE CONVERSION" filed on Dec. 16, 2009, the complete subject matter of which is incorporated herein by reference in its entirety.

FEDERALLY SPONSORED RESEARCH OR DEVELOPMENT

Not Applicable

MICROFICHE/COPYRIGHT REFERENCE

Not Applicable

BACKGROUND OF THE INVENTION

In order to improve the display of film-based content, it may be necessary to convert footage from one frame rate to another by way of selecting and processing the available input frames. Frame rate conversion is becoming increasingly important for use in LCD based displays, large screen TVs, and handheld devices. However, the manner in which the frame rate conversion is performed may affect the quality of the resulting video.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention provide a method and a system of providing frame rate upconversion by way of interpolating based on two frames of video.

The various aspects and representative embodiments of the method and system are substantially shown in and/or described in connection with at least one of the following figures, as set forth more completely in the claims.

These and other advantages, aspects, and novel features of the present invention, as well as details of illustrated embodiments, thereof, will be more fully understood from the following description and drawings.

BRIEF DESCRIPTION OF THE DRAWINGS

FIG. 1 is a diagram illustrating generation of interpolated frames between two adjacent input frames in accordance with an embodiment of the invention.

DETAILED DESCRIPTION OF THE INVENTION

Figure 2A:
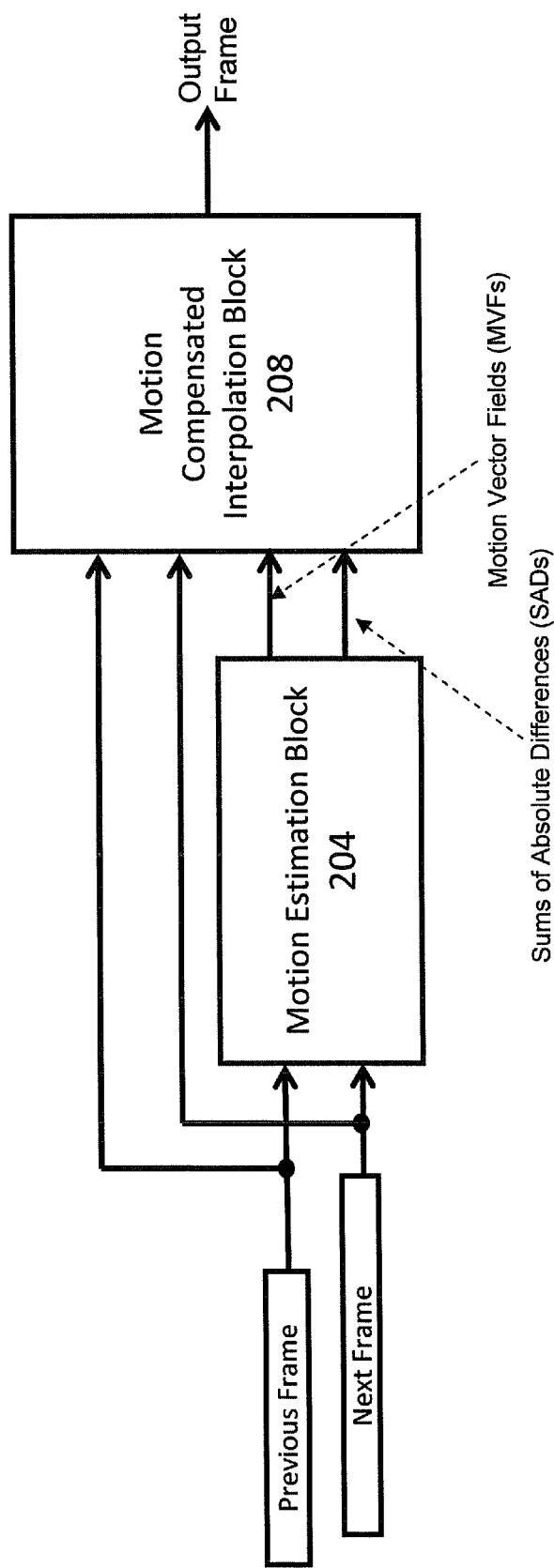
FIG. 2A is a block diagram of a system that performs frame rate conversion in accordance with an embodiment of the invention.

Various aspects of the invention can be found in a method and a system of performing a frame rate conversion (FRC). The various aspects of the invention relate to the generation of interpolated frames when performing frame rate conversion. The various aspects of the invention involve the selection of input frames for constructing the interpolated frames. In a first aspect of the invention, an interpolated frame is generated based on a single input frame. In a representative embodiment, one of two input frames is used to compute a motion compensated interpolated frame. The input frame chosen is based on the temporal position of the interpolated output frame relative to the two frames. The interpolated frame may be described as a motion compensated frame because a motion vector field is applied to one of the two input frames. The motion vector field (MVF) is a function of the selected frame and the interpolated frame time. Since the input frame that is chosen is the frame that is temporally closest to the interpolated frame, the approach is described as a "short sided" approach. While two estimates (or two motion compensated frames) may be computed using each of the two input frames, the estimate associated with the input frame that is temporally closest to the interpolated frame is typically used. In a representative embodiment, an interpolated output frame may be generated by way of using both estimates. The output frame may be generated by blending or combining the corresponding pixels of the two estimates (motion compensated interpolated frames) or by taking the weighted average of the corresponding pixels of the two estimates (motion compensated interpolated frames). Each of the two motion compensated interpolated frames may be derived from each of the two input frames. For example, when video is upconverted from 24 Hz to 120 Hz, the various aspects of this invention may utilize two successive or adjacent frames at 24 Hz to generate four interpolated output frames at 120 Hz. In this instance, there are five 120 Hz frames generated during one 24 Hz frame period. Furthermore, the various aspects of the present invention may involve the combining or blending of two interpolated frames, generated at two distinct hypothetical times, to produce a single output frame.

When using the "short-sided" approach, an interpolated output may be computed by way of using one of two input frames. The two input frames may comprise a first frame and a second frame. The interpolated frame is temporally located between the first frame time and the second frame time. Thus, the first frame may be described as a previous frame while the second frame may be described as a next frame. A first estimate of the interpolated frame may use the first frame and a first motion vector field which is a function of the first frame and the interpolated frame time (interpolation time). The second estimate of the interpolated frame may use a second frame and a second motion vector field which is a function of the second frame and the interpolated frame time. When using the bidirectional approach, the first and second estimates are combined or blended to yield the interpolated frame.

FIG. 1 is a diagram illustrating the generation of interpolated frames between two adjacent input frames (original frames) in accordance with an embodiment of the invention. FIG. 1 illustrates the two adjacent input frames at time T=0.0 and at time T=1.0 seconds. Also illustrated in FIG. 1 are N interpolated frames, located between the two adjacent frames, which are spaced out at every 1/(N+1) seconds. Thus, N+1 frames are generated for each input period. For example, in the case where the frame rate is to be upconverted from 24 Hz to 120 Hz, the input period equals ¹/₂₄ seconds while the output period is ¹/₁₂₀ seconds. Therefore, N+1=(120/24)=5 and the number of interpolated frames, N equals 4. To simplify the explanation, one may normalize the input frame rate to 1.0 Hz by assuming that the input frame rate is 1.0 Hz (i.e., 24 Hz/24) while the output frame rate is 5.0 Hz (i.e., 120 Hz/24). Thus, two consecutive input frames are received at times 0.0 and 1.0 seconds while it is desired to produce output frames at times, 0.2, 0.4, 0.6, and 0.8 seconds. Thus, in this example, the number of interpolated frames is equal to 4 (i.e., N=4).

FIG. 2A is a block diagram of a system that performs frame rate conversion in accordance with an embodiment of the invention. The system comprises a motion estimation block 204 and a motion compensated interpolation block 208. The motion estimation block 204 may comprise one or more circuits. The one or more circuits may comprise a processor and memory, for example. The memory may be used to store firmware and/or software used or executed by the processor. Likewise, the motion compensated interpolation block 208 may comprise one or more circuits. The one or more circuits may comprise a processor and memory, for example. The memory may be used to store firmware and/or software used or executed by the processor. As illustrated in FIG. 2A, the motion estimation block 204 receives inputs corresponding to two adjacent or temporally consecutive input frames of video. The two temporally consecutive input frames are described as a next frame and previous frame, as shown in FIG. 2A. The motion compensated interpolation block 208 also receives the two adjacent or temporally consecutive input frames, labeled next frame and previous frame, as shown in FIG. 2A. In addition to the next frame and the previous frame, the motion compensated interpolation block 208 also receives outputs from the motion estimation block 204. The outputs may comprise one or more motion vectors or motion vector fields (MVFs). In addition, the outputs may comprise one or more sums of absolute differences (SADs). The SADs may be based on the motion vectors or motion vector fields (MVFs) used by the previous frame to attain the next (or current) frame, for example. A SAD may be computed using corresponding pixels of the previous frame and the next frame. It may be computed by summing the absolute values of the differences between corresponding pixels of the next frame and motion compensated previous frame or between any two frames. The motion estimation block 204 may be used to determine the motion vectors or motion vector fields (MVFs). The motion compensated interpolation block 208 may utilize the one or more motion vectors or motion vector fields (MVFs) to perform motion compensated interpolation. As will be shown in FIG. 4, the motion compensated interpolation block 208 may utilize a difference measure such as a difference between a motion compensated frame based on a next frame and a motion compensated frame based on a previous frame. In another representative embodiment, the difference measure may comprise a sum of absolute differences (SAD). The difference measure may be used to determine the approach used by the motion compensated interpolation block 208 when generating the output pixels of an interpolated frame.

Figure 2B:
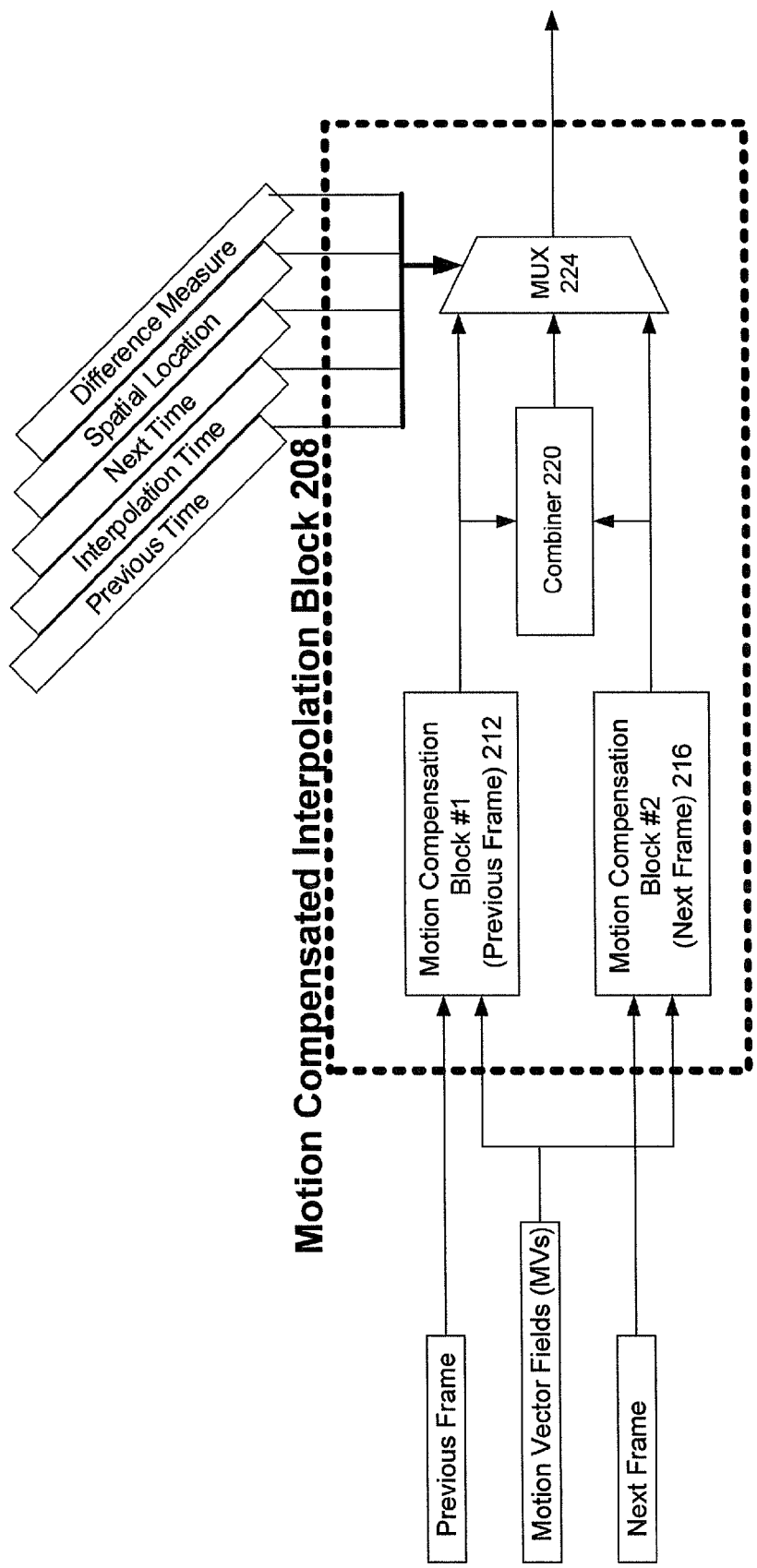
FIG. 2B is a block diagram of a motion compensated interpolation block in accordance with an embodiment of the invention.

FIG. 2B is a block diagram of a motion compensated interpolation block 208 in accordance with an embodiment of the invention. The block diagram illustrates and describes the motion interpolation block 208 shown in FIG. 2A. The motion compensated interpolation block 208 comprises a first motion compensation block 212, a second motion compensation block 216, a combiner 220, and a multiplexer 224. The first motion compensation block 212 receives a previous frame and one or more motion vector fields (MVFs) while the second motion compensation block receives a next (or current) frame and the one or more motion vector fields (MVFs). The first motion compensation block 212, a second motion compensation block 216, a combiner 220, and a multiplexer 224 may comprise any circuitry or hardware. The first motion compensation block 212 outputs a first estimate of the interpolated frame based on using a first frame. The first frame may comprise as previous frame. The second motion compensation block 216 outputs a second estimate of the interpolated frame based on using a second frame. The second frame may comprise a next frame. The first estimate of the interpolated frame may use the first frame and a first motion vector field which is a function of the first frame and the interpolated frame time (interpolation time). The second estimate of the interpolated frame may use the second frame and a second motion vector field which is a function of the second frame and the interpolated frame time. As illustrated in FIG. 2B, the first estimate is output by the first motion compensation block 212 while the second estimate is generated by the second motion compensation block 216. The first frame may be associated with a previous frame time while the second frame may be associated with a next frame time. The multiplexer (MUX) 224 may output the first estimate or the second estimate based on one or more control signals it receives. The first estimate and the second estimate may be combined by the combiner 220. The combiner 220 may compute a weighted average using the first estimate and the second estimate. The weighted average may be based on the time of occurrence of the interpolated frame in relation to the time of the first frame and the time of the second frame. The multiplexer output may be based on one or more control signals provided to its select input(s). Based on the control signals it receives, the multiplexer 224 may output the first estimate, the second estimate, or the output provided by the combiner 220.

The motion compensated interpolation block 208 receives one or more sums of absolute differences (SADs) provided by the motion estimation block 204. In a representative embodiment, the sum of absolute differences (SAD) may be used by the motion compensated interpolation block 208 as a difference measure. In a representative embodiment, a difference is computed between the two estimates of an interpolated frame as previously described. Thus, a difference measure may be provided by way of taking the difference or absolute difference between the first estimate and the second estimate. The difference measure may be used to determine if the short sided or a bidirectional motion compensated interpolation approach is performed. The difference measure may be used as a control signal to the multiplexer (MUX) 224 to select whether the "short side" approach or bidirectional approach is taken by the motion compensated interpolation block 208. The difference measure may be compared to a threshold to determine whether the "short side" approach or bidirectional approach is taken. For example, if the difference measure is less than the threshold, the short sided motion compensated interpolation approach may be taken. Otherwise, the bidirectional motion compensated interpolation approach may be taken. The motion compensated interpolation block 208 may also consider the spatial location of the frame when performing frame interpolation. For example, the border region of an interpolated frame may be processed differently compared to the rest of the interpolated frame. In a representative embodiment, the border region may be preferably processed using a bidirectional motion compensated interpolation approach.

Figure 3A:
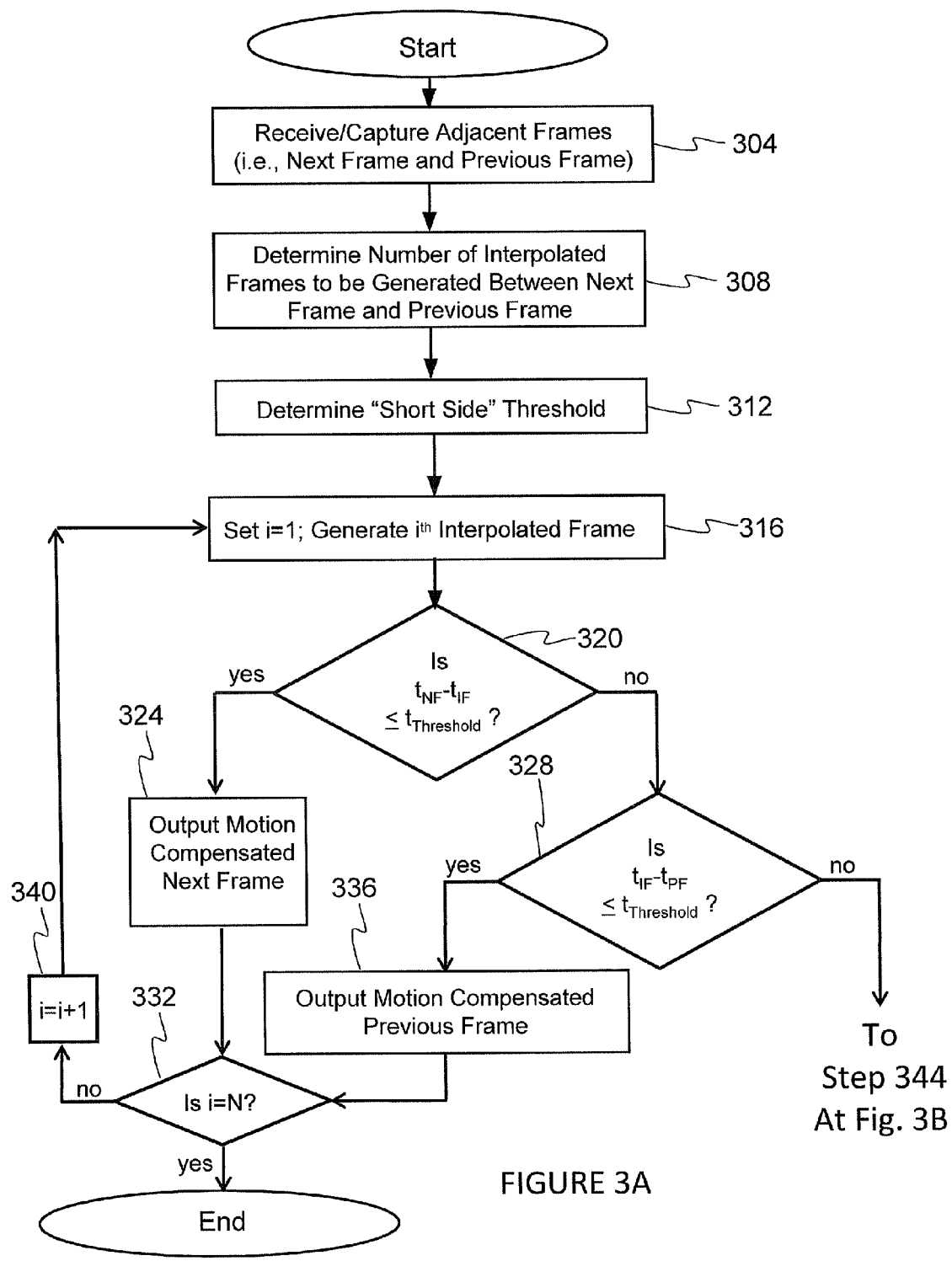
FIGS. 3A and 3B are operational flow diagrams of a method for performing frame rate conversion in accordance with an embodiment of the invention.
Figure 3B:
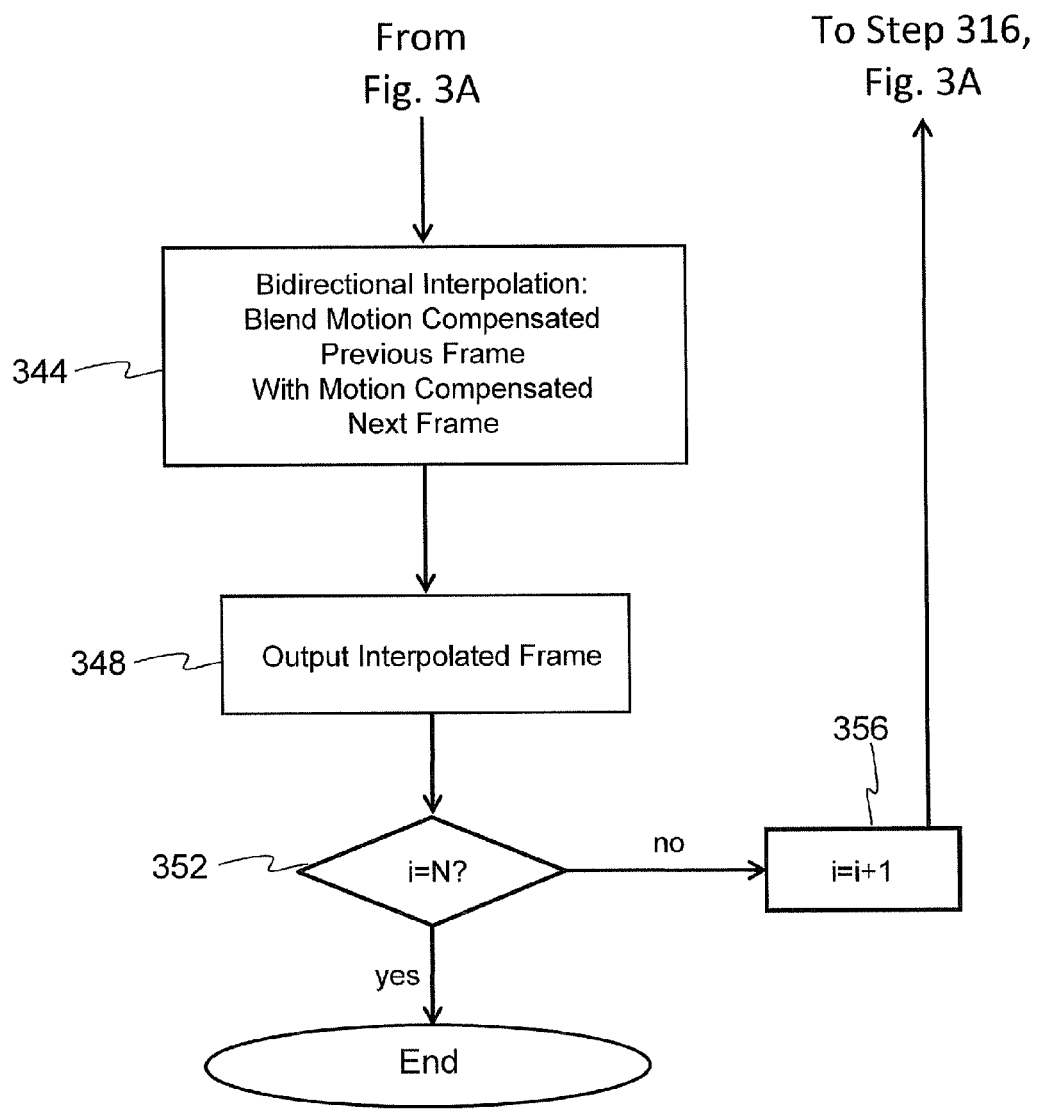

FIGS. 3A and 3B are operational flow diagrams of a method for performing frame rate conversion in accordance with an embodiment of the invention. The frame rate conversion may be performed using a "short side" or "bidirectional" motion compensated interpolation approach. The motion compensated interpolation may be accomplished by way of an interpolation using one of two adjacent input frames of video. For example, the interpolation comprises using the previous frame or the next frame of video. At step 304, adjacent frames (i.e., next frame and previous frame) are received and captured by the system previously described in FIG. 2. The number of interpolated frames to be generated between the next frame and previous frame is determined at step 308. As previously described, the value N corresponds to the number of interpolated frames. Thereafter, the process proceeds with step 312, where a "short side" threshold value is determined. For an interpolated frame that is output at a specified time, "short side" motion compensated interpolation is based on the input frame (either the previous frame or the next frame) which is closest in time to the specified time. Consequently, pixels corresponding to the frame (previous frame or next frame) nearest to the specified time are used. The "short-side" threshold may be defined to be a time value measured from either the previous frame time or the next frame time. For example, if the "short-side" threshold is equal to 20 percent of the input frame period (i.e., 0.2*(input frame period)), then any interpolated frame generated between the previous frame time and the previous frame time plus 0.2 times the input frame period would be generated using "short side" motion compensated interpolation by way of using the previous frame. Likewise, any interpolated frame generated between the start of the previous frame time plus 0.8 times the input frame period and the next frame time would be generated using "short side" motion compensated interpolation by way of using the next frame. If the specified time for outputting an interpolated frame occurs in the middle of the input frame period (i.e., at the midpoint between the previous frame time and the next frame time), then either side could be considered the "short-side" if the "short-side" threshold was equal to 50 percent of the input frame period. In such an instance, either the next frame or the previous frame could be used to generate the interpolated output frame. In the embodiment of FIG. 1, where the input frame rate is normalized to 1 Hz (period=1 second), the "short-side" threshold may be chosen as 0.2 seconds, for example. At step 316, interpolated frames are generated starting with i=1. Next, at step 320, a decision is made whether the time of the next frame ($t_{NF}$) minus the interpolated frame time ($t_{IF}$) is less than or equal to the "short-side" threshold value (i.e., $(t_{NF}-t_{IF}) \leq t_{threshold}$). If $(t_{NF}-t_{IF}) \leq t_{threshold}$, the process continues with step 324 in which a first estimate or motion compensated next frame is generated as the interpolated output frame. The motion compensated next frame may be computed by way of translating the next frame using a motion vector field (MVF) which is a function of the next frame and interpolated frame time ($t_{IF}$). Otherwise, the process continues with step 328. At step 328, a decision is made whether the interpolated frame time ($t_{IF}$) minus the time of the previous frame is less than or equal to the "short-side" threshold value ($t_{threshold}$). The threshold value used at step 328 may be a value which is different from the threshold value used at step 320. If $(t_{IF}-t_{PF}) \leq t_{threshold}$, the process continues with step 336 in which a second estimate or motion compensated previous frame is selected as the interpolated output frame. The motion compensated previous frame may be computed by way of translating the previous frame using a motion vector field which is a function of the previous frame and interpolated frame time ($t_{IF}$). Otherwise, the process continues with step 344. In a representative embodiment, step 328 may be bypassed or optional such that if the inequality $(t_{NF-tIF}) \leq t_{threshold}$, is not true, the process proceeds with step 336. At step 332, a determination is made whether the $i^{th}$ interpolated frame is equal to N, where N is the number of interpolated frames desired. If i equals N, the process has completed generating all interpolated frames within one input period. Otherwise, if i is not equal to N, the process loops back to step 340. At step 340, i is incremented by 1 and the process continues with step 316. At step 344, bidirectional motion compensated interpolation generates the $i^{th}$ interpolated output frame. The bidirectional motion compensation comprises combining the first estimate or motion compensated next frame with the second estimate or motion compensated previous frame. The combining may comprise blending the motion compensated next frame with the motion compensated previous frame in varying amounts. In a representative embodiment, the bidirectional motion compensated interpolation is performed by computing the average of corresponding pixel values from the motion compensated previous frame and the motion compensated next frame. In a representative embodiment, the bidirectional motion compensated interpolation is performed by computing the weighted average of corresponding pixel values using the motion compensated previous frame and the motion compensated next frame. In obtaining the motion compensated previous frame and the motion compensated next frame, one or more motion vectors or motion vector fields (MVFs) provided by the motion estimation block may be used to appropriately translate the pixels in the previous frame and the next frame. Thereafter, at step 348, the bidirectional motion compensated frame is output as the interpolated frame. At step 352, a determination is made whether the $i^{th}$ interpolated frame is equal to N, where N is the number of interpolated frames desired. If i equals N, the process has completed generating all interpolated frames within one input period. Otherwise, if i is not equal to N then the process continues with step 356. At step 356, i is incremented by 1 and the process loops back to step 316.

It has been found that interpolated frames generated at times that are very near in time to the time of an input frame, using short-sided motion compensated interpolation, often contain fewer artifacts than frames produced using bidirectional motion compensated interpolation. Furthermore, it is possible to realize significant savings in chip cost and power by using the various aspects of the methods presented in FIGS. 3A and 3B. This may be especially important in battery powered products.

Figure 4:
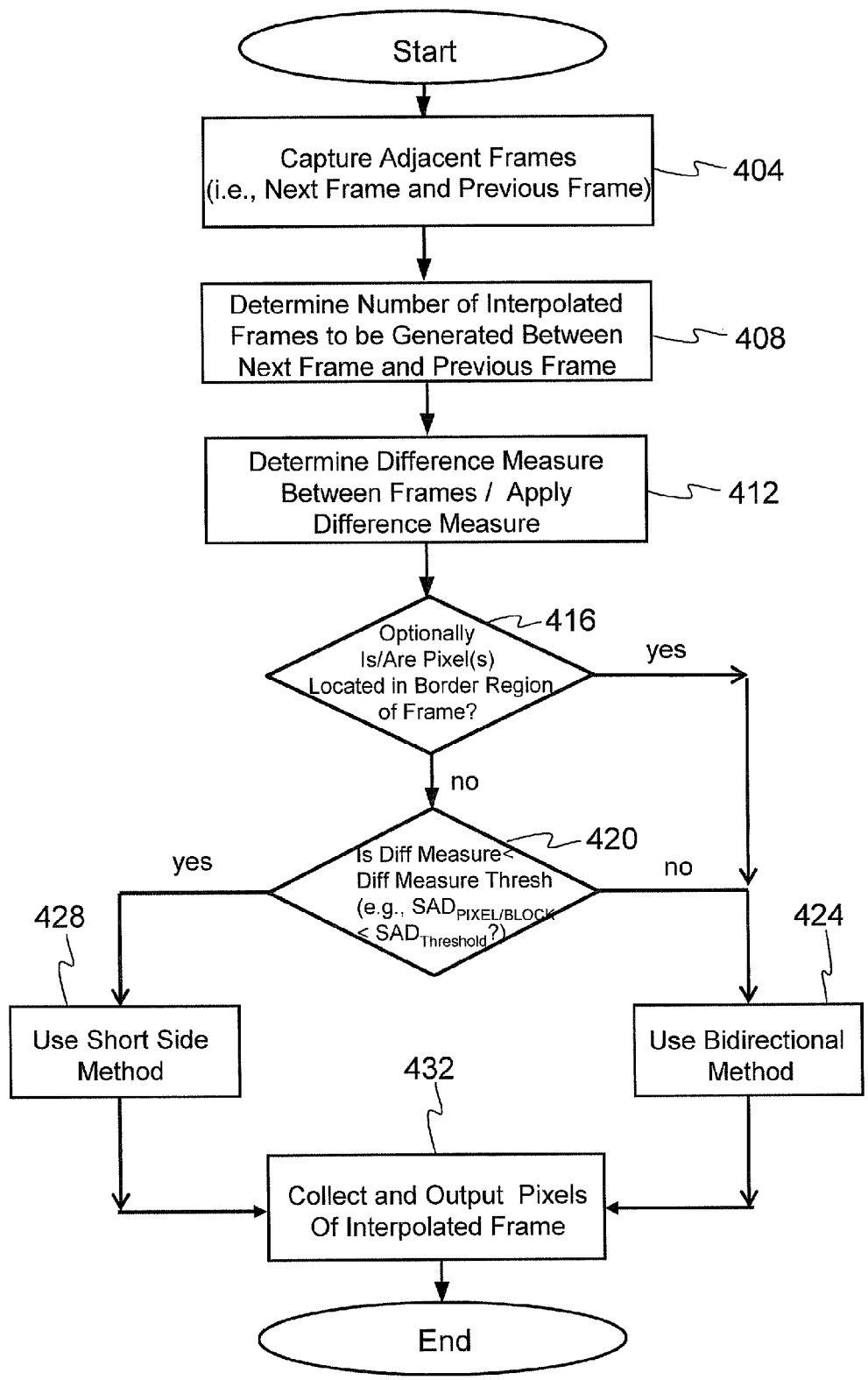
FIG. 4 is an operational flow diagram of a method for performing frame rate conversion in accordance with an embodiment of the invention.
Figure 5:
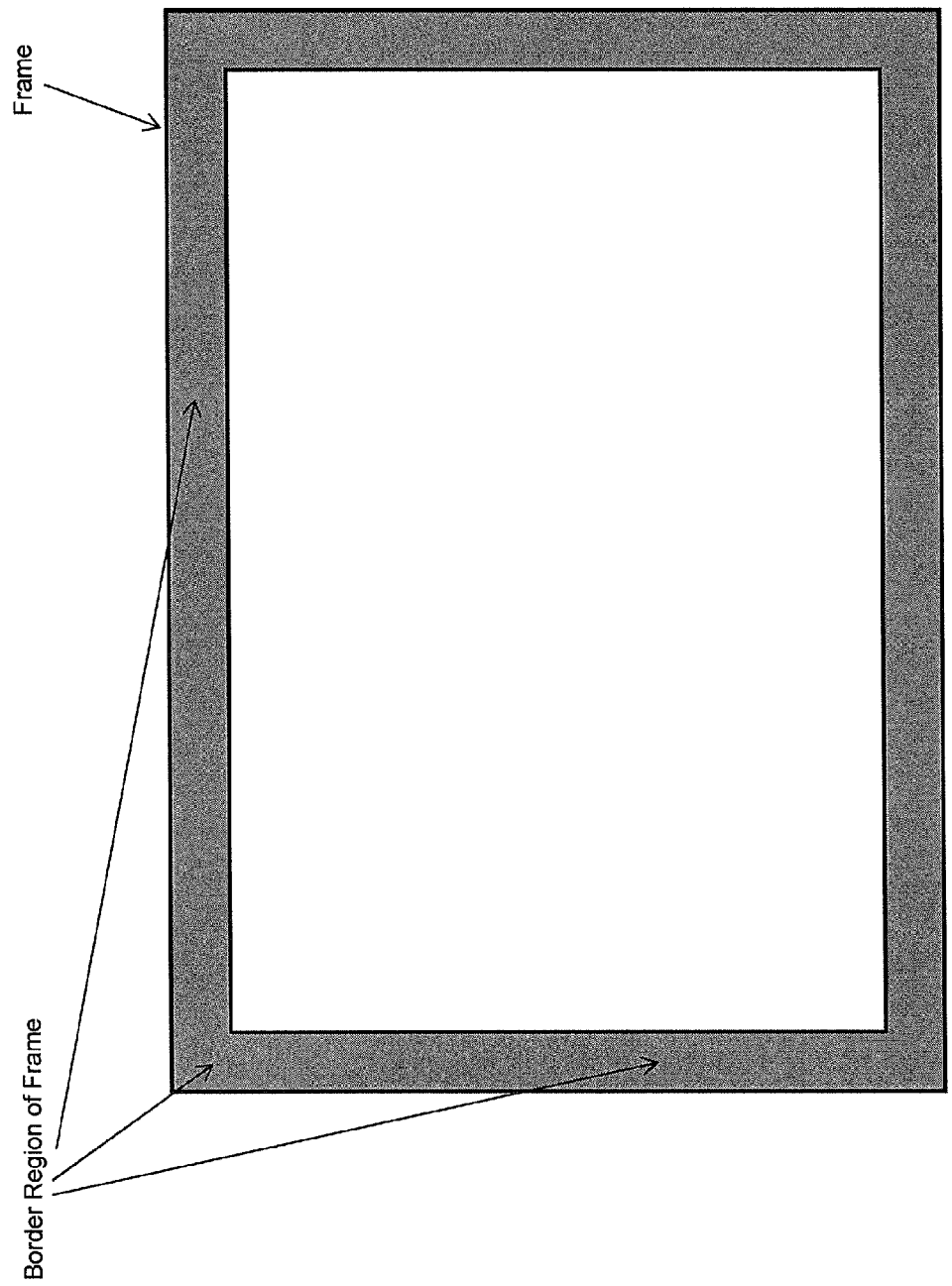
FIG. 5 is a diagram illustrating a border region of a frame of video which may be handled as a special case.

FIG. 4 is an operational flow diagram of a method for performing frame rate conversion in accordance with an embodiment of the invention. As was previously described in connection with FIGS. 3A and 3B, frame rate conversion may be performed using "short side" or "bidirectional" motion compensated interpolation. However, in the representative embodiment illustrated in FIG. 4, a difference measure, such as the sum of absolute differences (SAD) that is generated by the motion estimation block (as was shown in FIG. 2), for example, is used to determine whether the conversion is performed using "short side" or "bidirectional" motion compensated interpolation. The difference measure may comprise the sum of the absolute differences (SAD), for example. At step 404, adjacent frames (i.e., next frame and previous frame) are captured by the system described in FIG. 2A. The number of interpolated frames to be generated between the next frame and previous frame is determined at step 408. As previously described, the value N corresponds to the number of interpolated frames. Next, at step 412, the motion estimation block computes the difference measure (e.g., the sum of absolute differences (SAD)) using pixels of adjacent frames (i.e., the next frame and the previous frame). The SAD may be computed after translating the previous frame using a motion vector field (MVF), for example. A SAD may provide an indication of whether the bidirectional method should be used compared to the short side method. Optionally, at step 416, a determination is made whether one or more pixels or block of pixels being considered is/are located in a predetermined border region or area of the frame. FIG. 5 provides a diagram illustrating a frame of video. As shown in FIG. 5, the border region comprises the shaded area shown. The border region starts at the edges or perimeter of a frame. If the one or more pixels or block of pixels correspond to the border region, the process continues with step 424. At step 424, the bidirectional motion compensated interpolation method is used to generate the output frame. The bidirectional motion compensated interpolation method comprises the same bidirectional motion compensated interpolation method previously described in connection with FIGS. 3A and 3B (e.g., see step 344). Otherwise, the process continues with step 420 where it is determined whether the difference measure (e.g., SAD of the one or more pixels or block of pixels ($SAD_{PIXEL/BLOCK}$)) is less than (or less than or equal to) a predetermined difference measure threshold value (e.g., SAD threshold value ($SAD_{Threshold}$)). If, for example, the SAD is less than or equal to the SAD threshold, then the process continues with step 428 where a short side motion compensated interpolation method is used. The "short side" motion compensated interpolation method comprises the same type of "short side" motion compensated interpolation method previously described in connection with FIGS. 3A and 3B (e.g., see steps 320-340). For example, a motion compensated previous frame is generated if the $i^{th}$ interpolated frame occurs closer in time to the previous frame compared to the next frame. Otherwise, a motion compensated next frame is generated if the $i^{th}$ interpolated frame occurs closer in time to the next frame compared to the previous frame. If the interpolated output frame occurs exactly at the midpoint between the previous frame time and the next frame time, either the motion compensated next frame or the motion compensated previous frame could be selected as the interpolated output. At step 432, pixels generated using either the "short side" method or bidirectional method are collected and output as an interpolated frame. The process described in FIG. 4 may be performed for each i of N total interpolated frames. Furthermore, optional step 416 may comprise a decision making process for individually assessing one or more various spatial regions of a frame and applying the short side approach or bidirectional motion compensated interpolation based on one or more criterion. The criterion may comprise whether an absolute difference between an interpolated frame time and an input frame time is less than or equal to a threshold, for example.

Thus, an optional feature of the present invention involves selectively employing the "short side" method based on measurements which are indicative of the potential for significant image artifacts. Furthermore, another valuable optional feature of the present invention relates to making an exception to using the "short side" approach in parts of frames such as, for example, at the border regions of the active picture where image artifacts can be extremely noticeable.

In a representative embodiment, the method described in FIGS. 3A and 3B may be adapted to utilize the features described in the embodiment described in FIG. 4. Therefore, the features disclosed in connection with FIGS. 3A and 3B may be combined with the features disclosed in connection with FIG. 4.

The various aspects of the present invention may be realized in the form of hardware, software, or a combination thereof. The hardware may comprise one or more circuits, for example. Furthermore, the present invention may be realized using any kind of computer system or other apparatus adapted for carrying out the methods described herein. A typical combination of hardware and software may be a general-purpose computer system with a computer program that, when being loaded and executed, may control the computer system such that it executes the methods described herein. The general-purpose computer system may comprise one or more processors and memory for storing the computer program. The present invention may also be embedded in a computer program product, which comprises all the features enabling the implementation of the methods described herein, and which when loaded in a computer system is able to execute these methods. Program in the present context means any expression, in any language, code or notation, of a set of instructions intended to cause a system having an information processing capability to perform particular functions either directly or after either or both of the following: a) conversion to another language, code or notation; b) reproduction in a different material form.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of performing frame rate upconversion of video by way of generating an interpolated frame comprising:
    receiving a first frame of the video corresponding to a first frame time and a second frame of the video corresponding to a second frame time;
    using a first motion vector field and the first frame to compute a third frame at an interpolated frame time, wherein the first motion vector field is a function of the interpolated frame time and the first frame;
    using a second motion vector field and the second frame to compute a fourth frame at the interpolated frame time, wherein the second motion vector field is a function of the interpolated frame time and the second frame:
    computing a difference measure using the third frame and the fourth frame;
    determining if the difference measure is less than a first threshold value;
    if the difference measure is less than the first threshold value:
        computing a first absolute difference between the first frame time and an interpolated frame time, the interpolated frame time temporally located between the first frame time and the second frame time;
        selecting and outputting the third frame as an interpolated frame of the one or more interpolated frames if the first absolute difference is less than a second threshold value,
        otherwise, computing a second absolute difference between the interpolated frame time and the second frame time; and selecting and outputting the fourth frame as the interpolated frame if the second absolute difference is less than a third threshold value; and if the difference measure is not less than the first threshold:
combining pixel values of corresponding pixels from the third frame and the fourth frame to generate a fifth frame; and outputting the fifth frame as the interpolated frame.

2. The method of claim 1 wherein said first and said second frames correspond to successive input frames, said second frame corresponding to a previous frame, said first frame corresponding to a next frame.

3. The method of claim 1 wherein said combining pixel values comprises computing the average of said pixel values.

4. The method of claim 3 wherein said average comprises a weighted average of said third and fourth frames based on temporal distances from said interpolated frame time and said first frame time and said second frame time.

5. The method of claim 1 wherein said frame rate is upconverted by a value equal to the number of interpolated frames plus 1.

6. The method of claim 1 wherein said frame rate of said video is upconverted from 24 Hz to 120 Hz.

7. The method of claim 1 wherein said first and said second frames correspond to successive input frames, said first frame corresponding to a previous frame, said second frame corresponding to a next frame.

8. The method of claim 1 wherein said difference measure comprises computing differences between corresponding pixels of said third frame and said fourth frame.

9. A system for performing frame rate upconversion of video by way of generating an interpolated frame comprising:
one or more processors, one or more circuits, or any combination thereof operable for, at least:
receiving a first frame of the video corresponding to a first frame time and a second frame of the video corresponding to a second frame time;
using a first motion vector field and the first frame to compute a third frame at an interpolated frame time, wherein the first motion vector field is a function of the interpolated frame time and the first frame;
using a second motion vector field and the second frame to compute a fourth frame at the interpolated frame time, wherein the second motion vector field is a function of the interpolated frame time and the second frame;

computing a difference measure using the third frame and the fourth frame;
determining if the difference measure is less than a first threshold value;
if the difference measure is less than the first threshold value:
computing a first absolute difference between the first frame time and an interpolated frame time, the interpolated frame time temporally located between the first frame time and the second frame time;
selecting and outputting the third frame as an interpolated frame of the one or more interpolated frames if the first absolute difference is less than a second threshold value,
otherwise, computing a second absolute difference between the interpolated frame time and the second frame time; and
selecting and outputting the fourth frame as the interpolated frame if the second absolute difference is less than a third threshold value; and if the difference measure is not less than the first threshold:
combining pixel values of corresponding pixels from the third frame and the fourth frame to generate a fifth frame; and
outputting the fifth frame as the interpolated frame.

10. The system of claim 9 wherein said first and said second frames correspond to successive input frames, said second frame corresponding to a previous frame, said first frame corresponding to a next frame.

11. The system of claim 9 wherein said combining pixel values comprises computing the average of said pixel values.

12. The system of claim 11 wherein said average comprises a weighted average of said third and fourth frames based on temporal distances from said interpolated frame time and said first frame time and said second frame time.

13. The system of claim 9 wherein said frame rate is upconverted by a value equal to the number of interpolated frames plus 1.

14. The system of claim 9 wherein said frame rate of said video is upconverted from 24 Hz to 120 Hz.

15. The system of claim 9 wherein said first and said second frames correspond to successive input frames, said first frame corresponding to a previous frame, said second frame corresponding to a next frame.

* * * * *